(12) United States Patent
Norrman et al.

(10) Patent No.: US 11,014,069 B2
(45) Date of Patent: May 25, 2021

(54) METHOD AND CHROMATOGRAPHY MEDIUM

(71) Applicant: Cytiva BioProcess R&D AB, Uppsala (SE)

(72) Inventors: Nils Norrman, Uppsala (SE); Mattias Algotsson, Uppsala (SE); Stefan D. Eriksson, Uppsala (SE)

(73) Assignee: Cytiva BioProcess R&D AB, Uppsala (SE)

( * ) Notice: Subject to any disclaimer, the term of this patent is extended or adjusted under 35 U.S.C. 154(b) by 357 days.

(21) Appl. No.: 15/769,400

(22) PCT Filed: Oct. 28, 2016

(86) PCT No.: PCT/EP2016/076019
§ 371 (c)(1),
(2) Date: Apr. 19, 2018

(87) PCT Pub. No.: WO2017/076759
PCT Pub. Date: May 11, 2017

(65) Prior Publication Data
US 2018/0304231 A1    Oct. 25, 2018

(30) Foreign Application Priority Data
Nov. 6, 2015 (GB) .................................... 1519668

(51) Int. Cl.
*B01J 20/24* (2006.01)
*B01J 20/29* (2006.01)
(Continued)

(52) U.S. Cl.
CPC ............. *B01J 20/24* (2013.01); *B01J 20/265* (2013.01); *B01J 20/267* (2013.01);
(Continued)

(58) Field of Classification Search
CPC ...... B01J 20/24; B01J 20/28016; B01J 20/29; B01J 20/305; B01J 20/265; B01J 20/267;
(Continued)

(56) References Cited

U.S. PATENT DOCUMENTS 4,217,415 A * 8/1980 Barabino ........... B01D 15/3814
435/176
5,808,010 A * 9/1998 Ladisch ................. B01D 15/08
521/29
(Continued)

FOREIGN PATENT DOCUMENTS

WO    95/34674 A1    12/1995

OTHER PUBLICATIONS

Guo et al. Covalent immobilization of -amylase on magnetic particles as catalyst for hydrolysis of high-amylose starch. International Journal of Biological Macromolecules 87 (2016) 537-544. (Year: 2016).*
(Continued)

*Primary Examiner* — Katherine Zalasky McDonald
(74) *Attorney, Agent, or Firm* — Eversheds Sutherland (US) LLP

(57) ABSTRACT

The present invention relates to a method to improve chromatography beads. More closely, the invention relates to a novel method for production of dextran-containing porous media and chromatography media produced with this method. In the method, the chromatography media is subjected to dextranase-treatment leading to improved pressure-flow properties of the media.

8 Claims, 3 Drawing Sheets

(51) Int. Cl.
*B01J 20/30* (2006.01)
*B01J 20/28* (2006.01)
*B01J 20/26* (2006.01)
*B01J 20/32* (2006.01)
B01D 15/38 (2006.01)
B01D 15/36 (2006.01)

(52) U.S. Cl.
CPC ......... *B01J 20/28016* (2013.01); *B01J 20/29* (2013.01); *B01J 20/305* (2013.01); *B01J 20/3208* (2013.01); *B01J 20/3214* (2013.01); *B01J 20/3225* (2013.01); *B01J 20/3242* (2013.01); *B01J 20/3295* (2013.01); *B01D 15/361* (2013.01); *B01D 15/3804* (2013.01); *B01D 15/3847* (2013.01)

(58) Field of Classification Search
CPC ... B01J 20/3208; B01J 20/3214; B01D 15/08; B01D 15/26; B01D 15/34; B01D 15/361; B01D 15/38; B01D 15/3823
See application file for complete search history.

(56) References Cited

U.S. PATENT DOCUMENTS

| | | | |
|---|---|---|---|
| 6,241,894 B1 * | 6/2001 | Briggs | .................... B03C 1/035 210/222 |
| 6,509,184 B1 | 1/2003 | Decker et al. | |
| 2008/0283792 A1 * | 11/2008 | Axen | .................... H01F 1/0054 252/62.54 |
| 2012/0156779 A1 * | 6/2012 | Anneren | .............. C12N 5/0018 435/378 |

OTHER PUBLICATIONS

He et al. Magnetic separation techniques in sample preparation for biological analysis: A review. Journal of Pharmaceutical and Biomedical Analysis 101 (2014) 84-101. (Year: 2014).*
Hong et al. Covalent-bonded immobilization of enzyme on hydrophilic polymer covering magnetic nanogels. Microporous and Mesoporous Materials 109 (2008) 470-477. (Year: 2008).*
Rotkova et al. Laccase immobilized on magnetic carriers for biotechnology applications. Journal of Magnetism and Magnetic Materials 321(2009)1335-1340. (Year: 2009).*
Wang et al. Improving the stability and reusability of dextranase by immobilization on polyethylenimine modified magnetic particles. NewJ.Chem., 2018, 42, 8391. (Year: 2018).*
PCT International Search Report for PCT Application No. PCT/EP2016/076019 dated Jan. 30, 2017 (10 pages).
Abdel-Aziz et al., "Hydrolytic and Chromatographic Studies on the PEGylation of Dextranase from *Penicillium* sp.," Journal of Genetic Engineering and Biotechnology, 2012, 10:145-150.
Fukumoto et al., "Studies on Nold Dextranases," J. Biochem., 1971, 69:1113-1121.

* cited by examiner

METHOD AND CHROMATOGRAPHY MEDIUM

CROSS REFERENCE TO RELATED APPLICATIONS

This application claims the priority benefit of PCT/EP2016/076019 filed on Oct. 28, 2016 which claims priority benefit of Great Britain Application No. 1519668.6 filed Nov. 6, 2015. The entire contents of which are hereby incorporated by reference herein.

FIELD OF THE INVENTION

The present invention relates to a method to improve chromatography beads. More closely, the invention relates to a novel method for production of dextran-containing porous media and chromatography media produced with this method. In the method, the chromatography media is subjected to dextranase-treatment leading to improved pressure-flow properties of the media.

BACKGROUND

Within biotechnology, one of the most widely used separation methods is chromatography. The term chromatography embraces a family of closely related separation methods. The feature distinguishing chromatography from most other physical and chemical methods of separation is that two mutually immiscible phases are brought into contact wherein one phase is stationary and the other mobile. The sample mixture, introduced into the mobile phase, undergoes a series of interactions i.e. partitions between the stationary and mobile phases as it is being carried through the system by the mobile phase. Interactions exploit differences in the physical or chemical properties of the components in the sample. These differences govern the rate of migration of the individual components under the influence of a mobile phase moving through a column containing the stationary phase. Separated components emerge in a certain order, depending on their interaction with the stationary phase. The least retarded component elutes first, the most strongly retained material elutes last. Separation is obtained when one component is retarded sufficiently to prevent overlap with the zone of an adjacent solute as sample components elute from the column.

One of the most common types of chromatography is size exclusion chromatography (SEC). Pre-packed SEC columns are commonly used in the protein preparation and purification area. For many chromatography products there is however still a wish to improve the flow properties with maintained resolution. For SEC separations there is also the issue about these separations being generally rather slow in comparison to other liquid chromatography techniques like ion exchange or affinity chromatography.

SUMMARY OF THE INVENTION

The aim of the present invention was to provide a method for production of a chromatography media providing a media with altered properties compared to prior art.

In a first aspect, the invention provides a method to produce a chromatography medium, starting a chromatography medium comprising porous beads coupled with dextran inside the pores and on the bead surface, comprising a step of subjecting the chromatography medium to dextranase treatment.

Preferably, the dextranase is coupled to a support particle. In one embodiment the support molecule is larger than the pores of the chromatography media to be treated. In this case the dextranase cannot enter the pores and only dextran on the outside of the bead will be treated/removed.

The support particle or molecule may be a natural or synthetic chromatography bead or PEG (poly ethylene glycol) or any other molecule or particle of suitable size.

In one embodiment the support particle is magnetic, preferably magnetic chromatography beads.

In another embodiment of the invention the dextranase-coupled support particle may enter the pores of the chromatography medium. In this case, not only the dextran on the surface but also the dextran inside the pores of the beads will be treated with the dextranase.

The chromatography medium is preferably made of natural or synthetic resins. Some non-limiting examples are cellulose, agarose, chitosan, silica (porous glass), alumina, polystyrene, polyacrylates: i.e polymethacrylate, polyvinylethers, polyacrylamides, polyetyleneglygols, polyolefins: i.e polyethylenes, polypropylenes, polyesters: i.e polyglycol, polylactides.

In a preferred embodiment the chromatography medium is made of agarose, preferably the agarose is cross-linked.

In a further embodiment the dextran coupled to the chromatography medium is provided with a ligand, such as an ion exchange, affinity, hydrophobic interaction or multi-modal ligand. In this embodiment the dextran coupled ligands on the surface of the beads will be removed by the dextranase treatment but ligands attached to dextran inside the pores will remain intact if the support particle is large enough to not enter the pores. In this way a chromatography medium can be produced having an outer inactive surface and an inner core provided with active ligands.

In a second aspect the invention relates to a chromatography medium produced according to the above method. In a preferred embodiment the beads are made of cross-linked agarose and the dextran is not provided with any ligands. This is described in the examples and will provide a novel SEC media with improved flow properties.

DETAILED DESCRIPTION OF THE INVENTION

The present invention relates to porous chromatography beads provided with dextran inside the pores. Dextran is attached inside the pores of the beads during manufacture and defines the selectivity of the chromatography resin, and is thus required for obtaining the desired function of the chromatography resin. Dextran is covalently attached to cross-linked agarose, preferably highly cross-linked agarose. However, the present inventors have found that these types chromatography beads have a limitation in flow rate and discovered that this is due to the presence of dextran chains on the outer surface of these types of beads.

Figure 1:
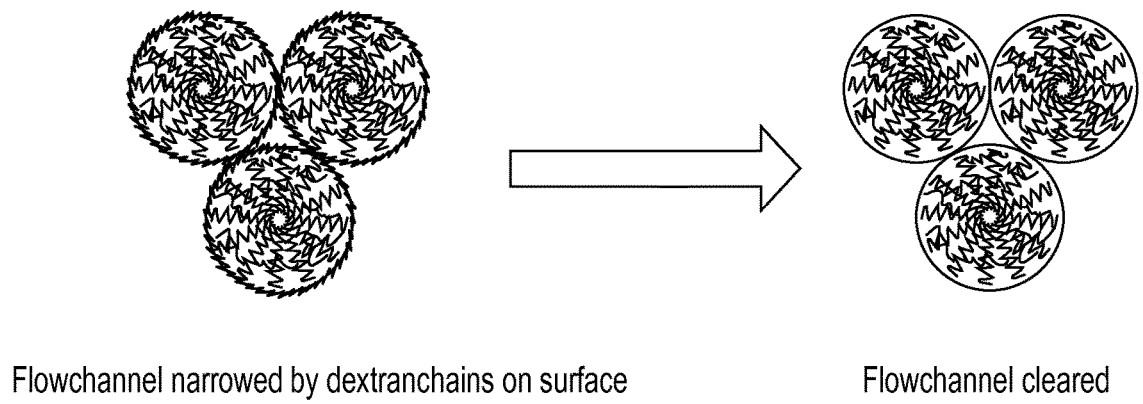
FIG. 1 is a schematic view of treatment of dextran-containing chromatography beads with PEG-ylated dextranase.

In one embodiment the present invention relates to a method for removing outer surface bound dextran, while not affecting dextran that is attached inside the bead's pores, as illustrated in FIG. 1. In this embodiment of the invention the chromatography beads are treated with dextranase coupled to a support particle being larger than the pores of the chromatography media to be treated, as illustrated in FIG. 2.

The treatment with particle bound dextranase as in this embodiment of the invention will only degrade dextran bound to the outer surface of the beads, but leave intact the dextran chains attached inside the pores. The result is a new chromatography resin with improved flow properties and maintained selectivity. The present inventors have found that dextran that is attached on the outer surface of the beads has no or negligible/limited impact on selectivity but it has a negative impact on the flow properties of the resin, i.e. the flow of liquid between the chromatography beads in a packed column, as illustrated in FIG. 3.

The degree of how much dextran that will be degraded can be controlled by the size of the support particle and its ability to enter the pores of the dextran containing chromatography bead. By dextranase-treatment the amount of dextran inside as well as outside the pores may be altered by using a smaller support particle than the pores of the chromatography resin. By controlling the size of the support particle and the pore size of the chromatography resin, various types of chromatography media can be designed for a variety of applications and selectivities, for example intended for target molecules of different size.

Figure 2:
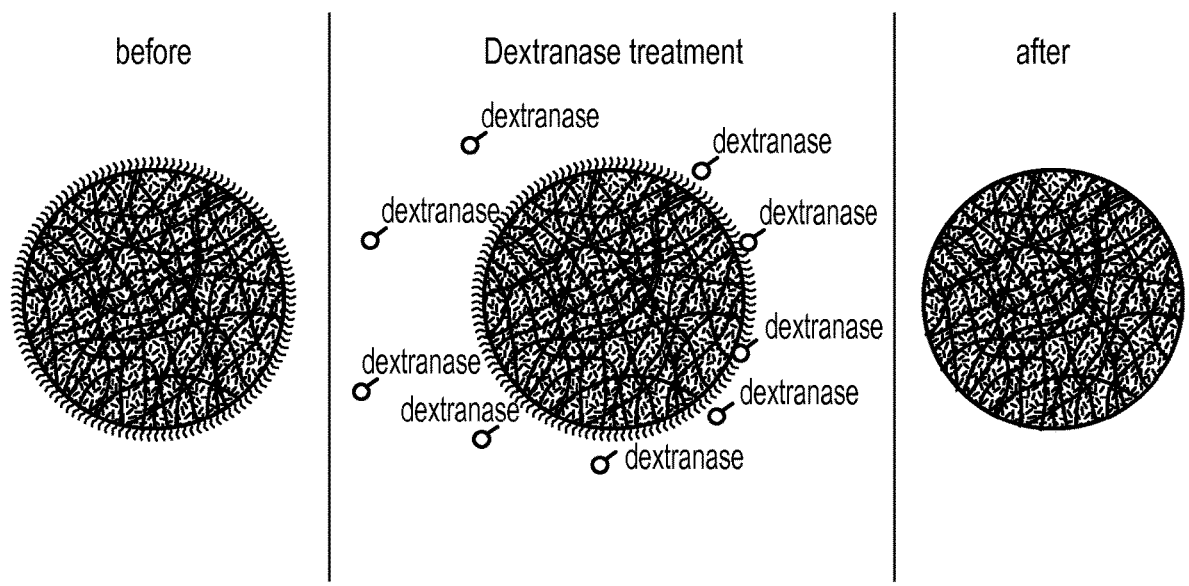
FIG. 2 shows the chromatography beads before, during and after dextranase treatment.

In FIGS. 1 and 2 it can be seen how the dextranase coupled to a support particle, larger than the pores of the dextran containing chromatography resin, degrades only the dextran on the surface of the chromatography resin. This treatment results in cleared flow channels between the particles.

Figure 3:
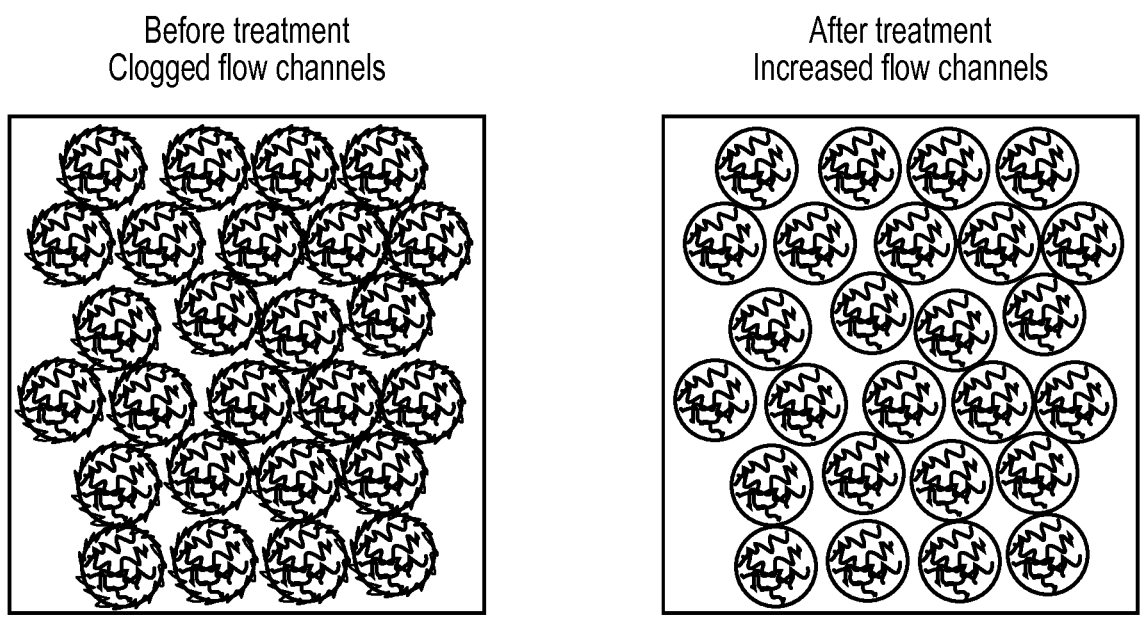
FIG. 3 is a schematic view of a packed column with beads before treatment (untreated beads) and after treatment.

In FIG. 3 it can be seen how the dextranase treatment opens up the flow channels between the resins in a schematic packed chromatography column enabling better pressure and flow properties.

EXAMPLES

The inventors have found that dextran coupled media, such as Superdex 200 Increase (GE Healthcare Bio-Sciences AB), can be treated with dextranase to increase the flow properties without loosing the resolution. Dextranase treatment according to the invention can remove dextran on the surface of the chromatography beads as well as inside the pores of the beads. The method of the invention is a great improvement compared to using decantation to achieve better flow properties without impairing the resolution.

Materials

| Name | Comment |
| --- | --- |
| Dextranase from *Penicillum* sp. | From Sigma Aldrich, Mw approximately 64 kDa |
| NHS Mag Sepharose | GE Healthcare Bio-Sciences AB, 10.1 mmol NHS/ml gel |
| TRIS | |
| Sodium chloride (NaCl) | |
| Acetic acid | |
| Sodium hydrogen carbonate (NaHCO3) | |
| Dextran AB | GE Healthcare Biosciences AB |
| Superdex 75 Increase | Prototype A17-5S |

Buffers and Dextran Solution

Tris buffer—50 mM Tris, 1 M NaCl, pH=8.0
Acetate buffer—50 mM Acetate pH 5.0
Coupling buffer—0.48M $NaHCO_3$, 1.5M NaCl, pH 8.3
2% Dextran AB solution pH 5: 2 g Dextran AB was dissolved in 100 ml Acetate buffer pH 5 (see above).

Example 1: Coupling of Dextranase to NHS Mag Sepharose

Dextranase is coupled to NHS activated magnetic beads according to the below reactions.

Reactions

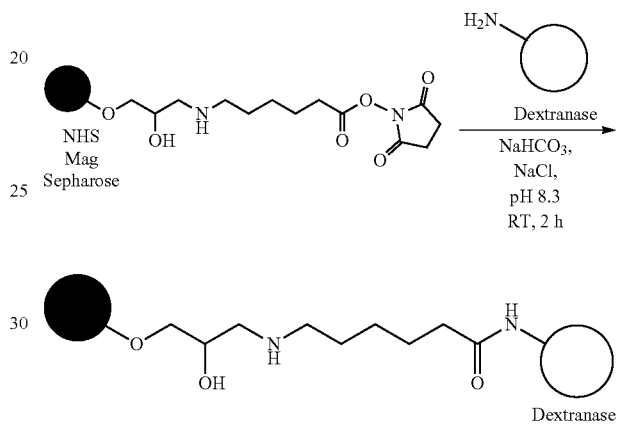

Coupling

Dextranase (400 mg) was added to 7 ml coupling buffer in a 15 ml Falcon tube. The dextranase were left to dissolve for 30 minutes on a shaking table.

Approximately 20 ml NHS Mag Sepharose (10.1 μmol NHS/ml) was washed with ice cold 1 mM HCl on a p4 glass filter (5×40 ml). The gel was then drained on the filter and 17 g was weighed into a 100 ml DURAN flask along with 5 ml 1 mM HCl. The dextranase solution from above was added to the NHS Mag Sepharose gel and stirring was started. The slurry were then left stirring at RT for 2 hours. The NHS Mag Sepharose gel were then washed on a glass filter (p4) with Tris buffer pH 8 1GV (1 gel volume 0 20 ml)×3, Acetate buffer pH 5 1GV×3 and then again with Tris buffer 1GV×3.

40 ml Tris buffer was then added to the gel on the filter and then left on the filter for 60 minutes (removal of remaining NHS groups).

The gel was finally washed with water 1GV×5.

Example 2: Test of Dextranase Activity on Dextran Solution

The following tubes were prepared:
Tube 1 (Reference):
2 g of non-coupled NHS Mag Sepharose media+5 ml 2% Dextran AB pH 5 solution Tube 2:
3 g of dextranase coupled to Mag Sepharose media from example 1+5 ml 2% Dextran AB pH 5 solution Tube 3:
46 mg of dextranase+5 ml 2% Dextran AB pH 5 solution Tube 4:
2% Dextran AB pH 5 solution Tube 1 and 2 were left on a shaking table in RT for approximately 22 hours, while Tube 3 were left on a shaking table at RT for about 4 hours. Tube 4 were kept in a fridge.

The supernatants from the tubes were analysed for glucose content to determine if any degradation of dextran had occurred, see Example 5.

Example 3: Test of Dextranase Activity on Chromatography Beads

Approximately 100 ml of a Superdex 75 increase prototype called A17-5S was washed with water on a glass filter (5×200 ml). 40 g of drained gel was then weighed into two duran flasks (100 ml) with lids that could be mounted on an overhead stirrer. And magnetic beads added according to below:

Flask 5 (Ref):
40 g Superdex 75 increase prototype+5 g NHS-Mag sepharose (washed in water)+25 ml Acetate buffer pH 5

Flask 6:
40 g Superdex 75 increase prototype+5 g Dextranase-Mag sepharose (from example 1)+25 ml Acetate buffer pH 5

The pH in the flasks were measured to 5.4. The flasks were then mounted on a stirrer which were tilted and stirring was begun. An homogenous slurry were formed after a few minutes.

Samples removed from supernatants after different time intervals, for glucose content analyses see table in example 5).

Example 4: Test of Dextranase Activity

An additional reference flask with gel and dextranase was also prepared to see how fast the free dextranase would degrade the dextran on the beads.

Flask 7:
9 g Superdex 75 increase prototype A17-5S+10 mg Dextranase+5 ml Acetate buffer pH 5

Flask 8:
40 g Superdex 75 increase prototype A17-5S+5 g Dextranase-Mag sepharose (from example 1)+25 ml Acetate buffer pH 5 were put in a 100 ml duran flask and rotation stirring was begun (same as for flask 5&6).

Samples were removed from supernatants after different time intervals for glucose content analyses, see example 5.

Example 5: Analysis of Dextran/Glucose Content

Analysis of dextran content was made with the Accu-Chek system from Roche (ordinarily used for Diabetes blood sugar measurements).

A drop of each sample were placed on the test strip and the glucose content was measured by the instrument:

TABLE 1

Measurements of glucose content

| Sample | Time (h) | Result | Comment |
| --- | --- | --- | --- |
| Tube 1 | 24 | LO | No glucose should be present which the results indicates |
| Tube 2 | 24 | Hi | Digested dextran solution, High value expected |
| Tube 3 | 24 | Hi | Digested dextran solution, High value expected |
| Tube 4 | 24 | LO | No glucose should be present which the result indicates |
| Flask 5 | 24 | LO | Ref, No glucose should be present which the result indicates |
| Flask 6 | 24 | 1.7 mmol/L | Sample after 24 hours, Lower value than for tube 2 which was expected. |
| Flask 6 | 96 | 7.9 mmol/L | Increased value after the weekend |
| Flask 6 | 120 | 11.9 mmol/L | Study stopped |
| Flask 7 | 24 | Hi | Diluted 1 time with water gave 16.2 mmol/L and further dilution 1 time gave a value of 7.8 mmol/L |
| Flask 8 | 48 | 1.0 mmol/L | left for stirring for an additional 24 hours |
| Flask 8 | 72 | 1.4 mmol/L | Experiment stopped and evaluated. |

Figure 4:
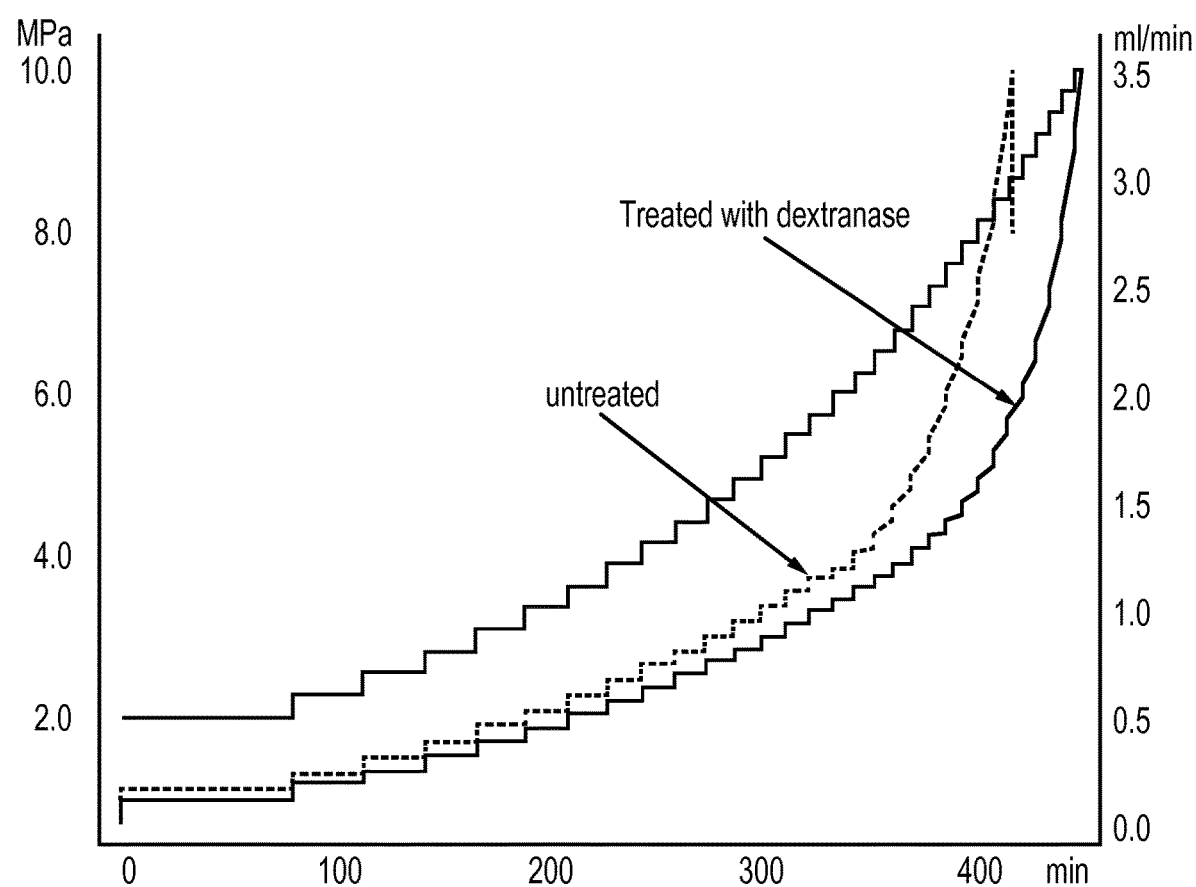
FIG. 4 is a diagram showing the pressure-flow properties of untreated vs. dextrans-treated chromatography medium.

LO and HI indicates that the result is outside of the expected measurement area (higher or lower) for blood sugar measurements. It can be seen that the dextran and the resins in itself does not give a positive result in the analysis (see tube 1 & 4 and flask 5) but that the digested dextran (tube 2 & 3) gives a high glucose content. The results from flasks 6 and 8 shows that the dextranase coupled to the resins degrades dextran on the Superdex 75 Increase prototype producing glucose in the supernatant. The degradation however occurs to a lesser degree compared to the free dextranase used in flask 7 which also can enter the pores of the Superdex 75 Increase prototype. After the study the gel were subjected to column packing and gel filtration analysis. The pressure flow properties are shown in FIG. 4.

Pressure flow analyses (FIG. 4) shows that the dextranase treatment improves the properties of the resins (dextranase treated prototype from flask 8 compared to untreated reference resins), giving a lower pressure increase when increasing the flow and a higher collapse flow. The results are also shown numerically in Table 2.

TABLE 2

Results from pressure flow analyses

| Prototype | 0.5 ml/min (Mpa) | Max flow stabil column (ml/min) | Max flow stabil column (Mpa) | Collaps flow (ml/min) | Comment |
|---|---|---|---|---|---|
| Superdex 75 Increase | 1.05 | 2.2 | 4.4 | 3.0 | Reference resin |
| Superdex 75 Increase dextranase treated | 0.94 | 2.7 | 4.7 | 3.5 | Prototype resin from flask 8 in Example 4) |

In the Examples, a Superdex 75 Increase prototype has been used. The properties of this prototype is that it is an highly cross-linked agarose bead with a bead size of about 8-9 µm and a dextran content of approximately 20-30 mg/ml.

Any other bead containing dextran or modified dextran could also be treated according to the invention.

The invention claimed is:

1. A method to produce a chromatography medium, the chromatography medium comprising porous beads coupled with dextran inside the pores and on the bead, the method comprising subjecting the chromatography medium to dextranase treatment wherein the dextranase is coupled to a magnetic support particle.

2. The method according to claim 1, wherein the magnetic support particle is larger than the pores of the chromatography media to be treated.

3. The method according to claim 1, wherein the magnetic support particle comprises natural or synthetic chromatography beads or PEG (poly ethylene glycol).

4. The method according to claim 3, wherein the dextranase-coupled support particle enters the pores of the chromatography medium.

5. The method according to claim 1, wherein the chromatography medium is made of natural or synthetic resins.

6. The method according to claim 5, wherein the chromatography medium is made of agarose.

7. The method according to claim 6, wherein the agarose is cross-linked.

8. The method according to claim 1, wherein the dextran coupled to the chromatography medium is provided with a ligand.

* * * * *